United States Patent
Hino et al.

(10) Patent No.: US 10,358,984 B2
(45) Date of Patent: Jul. 23, 2019

(54) GAS TURBINE POWER GENERATION SYSTEM, CONTROL METHOD FOR GAS TURBINE POWER GENERATION SYSTEM, AND CONTROL DEVICE FOR GAS TURBINE POWER GENERATION SYSTEM

(71) Applicant: Hitachi, Ltd., Chiyoda-ku, Tokyo (JP)

(72) Inventors: Noriaki Hino, Tokyo (JP); Naohiro Kusumi, Tokyo (JP); Aung Ko Thet, Tokyo (JP); Tomofumi Shiraishi, Tokyo (JP); Masatoshi Yoshimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 134 days.

(21) Appl. No.: 15/533,115

(22) PCT Filed: Dec. 18, 2014

(86) PCT No.: PCT/JP2014/083518
§ 371 (c)(1),
(2) Date: Jun. 5, 2017

(87) PCT Pub. No.: WO2016/098220
PCT Pub. Date: Jun. 23, 2016

(65) Prior Publication Data
US 2017/0363013 A1    Dec. 21, 2017

(51) Int. Cl.
*F02C 3/10* (2006.01)
*F02C 6/00* (2006.01)
(Continued)

(52) U.S. Cl.
CPC ............... *F02C 9/20* (2013.01); *F01D 15/10* (2013.01); *F02C 3/10* (2013.01); *F02C 6/00* (2013.01);
(Continued)

(58) Field of Classification Search
CPC .... F01D 15/10; F02C 3/10; F02C 6/00; F02C 9/00; F02C 9/20; H02J 3/40;
(Continued)

(56) References Cited

U.S. PATENT DOCUMENTS 6,348,743 B1 * 2/2002 Sakasai ..................... H02P 9/04
290/40 A
2005/0131616 A1    6/2005 Fujii
(Continued)

FOREIGN PATENT DOCUMENTS

JP    58-63045 A    4/1983
JP    5-18272 A    1/1993
(Continued)

OTHER PUBLICATIONS

International Search Report (PCT/ISA/210) issued in PCT Application No. PCT/JP2014/083518 dated Mar. 24, 2015 with English translation (five pages).
(Continued)

*Primary Examiner* — Charles Reid, Jr.
(74) *Attorney, Agent, or Firm* — Crowell & Moring LLP

(57) ABSTRACT

The gas turbine power generation system of the present invention repeats either the supply or absorption of power, in addition to generating power. A frequency converter for converting a frequency of power is connected between the rotating electrical machine and a power system via a power line, and a controller obtains a request for an output from the gas turbine power generation system and controls the combustor on the basis of the request. With respect to the frequency converter, the controller performs frequency converter control for changing the rotational speed of the rotating electrical machine on the basis of the request. The rotating electrical machine supplies or absorbs power in accordance with the change in the rotational speed. With respect to the speed adjustment mechanism, the controller performs speed adjustment mechanism control for setting the rotational speed to a reference value.

7 Claims, 5 Drawing Sheets

(51) Int. Cl.
  *F02C 9/00*  (2006.01)
  *F02C 9/20*  (2006.01)
  *H02J 3/40*  (2006.01)
  *H02K 7/18*  (2006.01)
  *H02P 9/04*  (2006.01)
  *F01D 15/10*  (2006.01)
  *H02J 15/00*  (2006.01)
  *H02P 101/25*  (2016.01)

(52) U.S. Cl.
  CPC ............. *F02C 9/00* (2013.01); *H02J 3/40* (2013.01); *H02J 15/006* (2013.01); *H02K 7/1823* (2013.01); *H02P 9/04* (2013.01); *F05D 2220/32* (2013.01); *F05D 2220/76* (2013.01); *F05D 2240/12* (2013.01); *F05D 2240/35* (2013.01); *F05D 2270/02* (2013.01); *F05D 2270/05* (2013.01); *F05D 2270/061* (2013.01); *H02P 2101/25* (2015.01)

(58) Field of Classification Search
  CPC ........ H02J 15/006; H02K 7/1823; H02P 9/04; H02P 2101/25; F05D 2220/32; F05D 2220/76; F05D 2240/12; F05D 2240/35; F05D 2270/02; F05D 2270/05; F05D 2270/061

USPC ...................................................... 290/40 A
See application file for complete search history.

(56) References Cited

U.S. PATENT DOCUMENTS

2015/0040640 A1* 2/2015 Chen ...................... G01L 25/00
                     73/1.15
2015/0171705 A1 6/2015 Hino et al.

FOREIGN PATENT DOCUMENTS

| JP | 2004-254476 A | 9/2004 | |
| JP | 2005-171873 A | 6/2005 | |
| JP | 2010-65636 A | 3/2010 | |
| WO | WO 2014/020772 A1 | 2/2014 | |
| WO | WO-2014020772 A1 * | 2/2014 | ............ F01D 15/10 |

OTHER PUBLICATIONS

Japanese-language Written Opinion (PCT/ISA/237) issued in PCT Application No. PCT/JP2014/083518 dated Mar. 24, 2015 (four pages).

* cited by examiner

GAS TURBINE POWER GENERATION SYSTEM, CONTROL METHOD FOR GAS TURBINE POWER GENERATION SYSTEM, AND CONTROL DEVICE FOR GAS TURBINE POWER GENERATION SYSTEM

TECHNICAL FIELD

The present invention relates to a gas turbine power generation system.

BACKGROUND ART

When renewable energy such as wind power generation and solar power generation spreads, there are concerns that the entire power system becomes unstable due to fluctuations in power generation output. Meanwhile, it is necessary to level the load by changing the output of a conventional thermal power generator. Among the thermal power generators, gas turbine power generation is expected to be able to level fluctuations in renewable energy output, because the startup time is shorter than the coal-fired power generation and the load change rate is also large.

As a technique relating to a gas turbine that drives a power generator and the like, for example, PTL 1 discloses a two-shaft gas turbine which has a first rotation shaft which expands the compressed air sent from a rotary compressor by a combustor and drives the high-pressure turbine by the combustion gas to allow the compressor to autonomously rotate by the driving force, and a second rotation shaft which drives a power generator by a low-pressure turbine installed on a separate shaft downstream the high-pressure turbine.

PTL 2 suggests a method for using a flywheel device as a device for storing energy to achieve a short-time power balance.

CITATION LIST

Patent Literature

PTL 1: JP 2010-65636 A
PTL 2: JP 58-63045 A

SUMMARY OF INVENTION

Technical Problem

The flywheel absorbs and releases kinetic energy of rotation by raising or lowering the rotational speed of a rotating body. When a motor for driving a frequency converter (an inverter) changes the rotational speed of the rotating body, electric energy can be released and absorbed via the frequency converter by the change of the kinetic energy of the rotating body. Since the response of the flywheel to a power command is equal to the response time of the torque control for the motor, the time constant of the flywheel is about 100 ms at the most, which is very high speed. However, since the flywheel uses the rotating body, it is not possible to perform further charging and discharging when stopping or over-rotating. If a permissible range of the rotational speed is set as ΔN and a change in the kinetic energy between them is set as ΔE, it is necessary to control a time integral value of an arbitrary charge and discharge output waveform so as not to reach ΔE.

Therefore, such a power storage device cannot be used for applications that continuously output and input pulses in the same direction. When the rotational speed reaches the upper and lower limits by the charge and discharge, the power storage device cannot be operated until a command in an opposite direction is issued. Although the flywheel can perform charging and discharging in which positive and negative states are regularly switched, since it is not possible to predict the charging and discharging command in the case of the purpose of leveling the change in the power demand, the flywheel is not practical for use due to large limitations.

Solution to Problem

In order to solve the above problem, a gas turbine power generation system according to an embodiment of the present invention includes a first rotation shaft, a compressor which generates compressed air by pressurizing air in accordance with rotation of the first rotation shaft, a combustor which generates combustion gas by mixing and combusting the compressed air and the fuel, a first turbine which rotates by receiving the combustion gas to drive the first rotation shaft, a rotating electric machine connected to the first rotation shaft, a speed adjustment mechanism which controls the speed of the compressor by adjusting the amount of the air, a frequency converter which is connected between the rotating electric machine and an electric power system via an electric power line to convert the frequency of the electric power, and a controller which acquires a request for output of the gas turbine power generation system and controls the combustor on the basis of the request. The controller performs a frequency converter control for changing the rotational speed of the rotating electric machine on the basis of the request, on the frequency converter, the rotating electric machine performs supply or absorption of electric power in accordance with the change in the rotational speed, and the controller performs a speed adjustment mechanism control for adjusting the rotational speed to match the reference value, on the speed adjustment mechanism.

Advantageous Effects of Invention

It is possible to repeat one of the supply or absorption of the electric power, in addition to the power generation.

DESCRIPTION OF EMBODIMENTS

Embodiments of the present invention will be described below with reference to the drawings.

First Embodiment

In the present embodiment, a gas turbine combined power generation system using a two-shaft gas turbine will be described.

Figure 1:
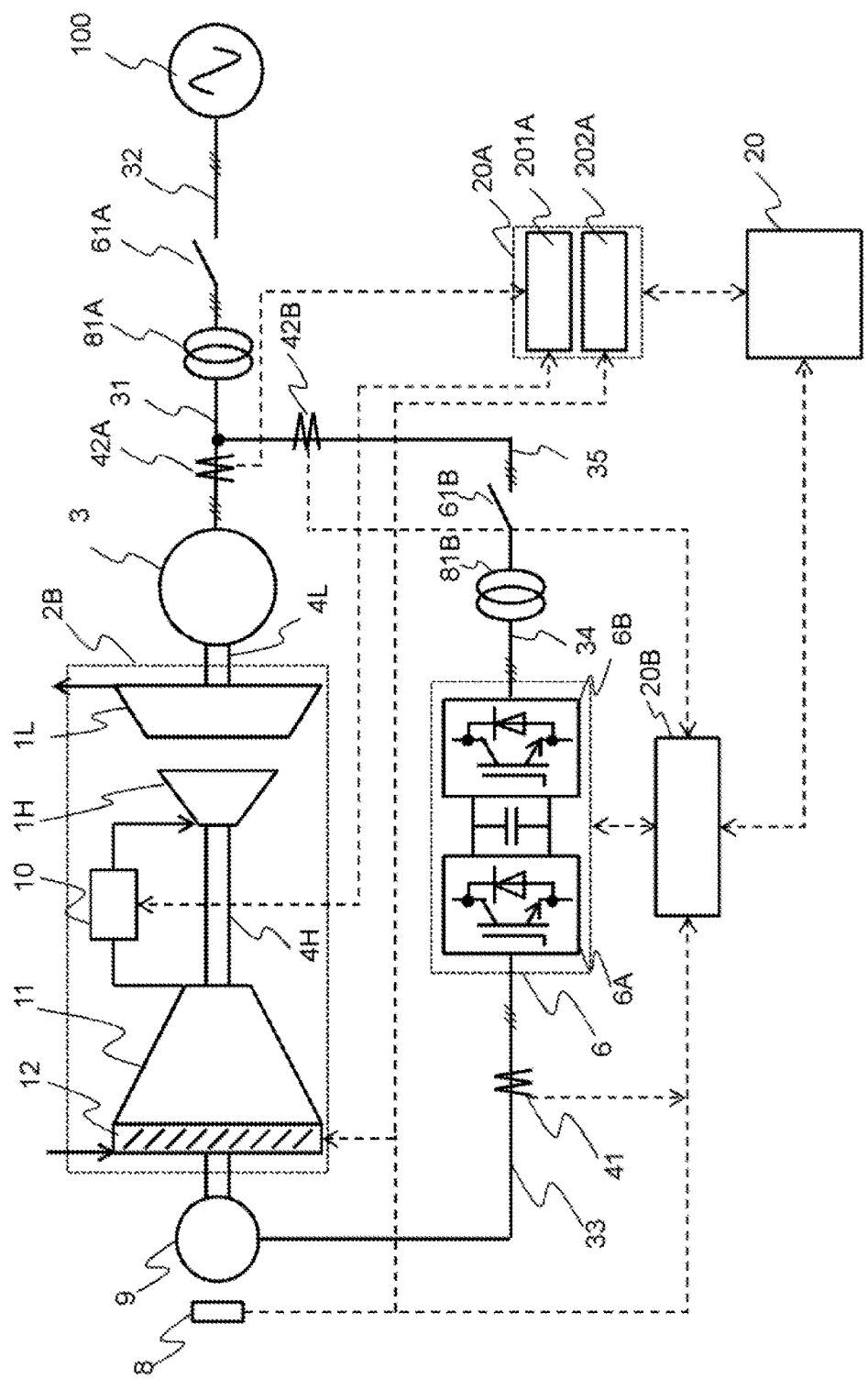
FIG. 1 illustrates a configuration of a gas turbine combined power generation system according to a first embodiment of the present invention.

FIG. 1 illustrates a configuration of a gas turbine combined power generation system according to a first embodiment of the present invention.

In this drawing, the gas turbine combined power generation system of this embodiment includes a two-shaft gas turbine 2B, a synchronous power generator 3 driven by the gas turbine 2B, an electric motor 9 connected to the gas turbine 2B, and a frequency converter 6 which converts the frequency of the electric power of the electric motor 9. Thereafter, the gas turbine combined power generation system may be referred to as a power generation system.

The gas turbine 2B includes a compressor 11 that pressurizes the taken-in air (outside air) to generate compressed air, a combustor 10 that mixes and combusts the compressed air and fuel, a high-pressure turbine 1H that is driven by the combustion gas obtained by the combustor 10, a first rotation shaft 4H that connects the compressor 11 and the high-pressure turbine 1H, a low-pressure turbine 1L that is driven by the combustion gas after driving the high-pressure turbine 1H, and a second rotation shaft 4L connected to the low-pressure turbine 1L.

The second rotation shaft 4L of the gas turbine 2B and the synchronous power generator 3 are mechanically connected to each other without using a gear. The second rotation shaft 4L and the synchronous power generator 3 may be connected to each other via a gear.

Meanwhile, the first rotation shaft 4H of the gas turbine 2B and the electric motor 9 are mechanically connected to each other without using a gear. Since the electric motor 9 accelerates and decelerates the first rotation shaft 4H, it is possible to enhance reliability by not using a gear.

Next, the electrical configuration of the power generation system will be described. The synchronous power generator 3 is connected to an external system 100 (electric power system) via a power transmission path (power line) 31, a transformer 81A which converts a voltage, a circuit breaker 61A provided to make it possible to interrupt the transmission of the electric power, and a power transmission path 32. The electric motor 9 is connected to the power transmission path 31 via a power transmission path 33, a frequency converter 6, a power transmission path 34, a transformer 81B, a circuit breaker 61B, and a power transmission path 35. The power transmission paths 31, 32, 33, 34, and 35 are three-phase electric wires.

Here, the capacities of the electric motor 9 and the frequency converter 6 are smaller than the capacity of the synchronous power generator 3. In addition, the frequency converter 6 is connected to the low-voltage side of the transformer 81B, and the synchronous power generator 3 is connected to the high-voltage side of the transformer 81B. That is, when the electric power is output from the electric motor 9, the output of the electric motor 9 is stepped up by the transformer 81B and is output to the system 100. When electric power is input to the electric motor 9, the output of the synchronous power generator 3 is stepped down by the transformer 81B and is input to the electric motor 9.

The operation of this embodiment will be described. Since the synchronous power generator 3 rotates synchronously with the AC frequency of the power supply in the system 100, the rotational speed thereof is always constant. Generally, the output of the rotating electric machine is uniquely determined by the rotational speed and torque. However, since the rotational speed of the synchronous power generator 3 is constant in this way, the torque is changed in order to increase or decrease the output of the synchronous power generator 3. The torque is obtained from the low-pressure turbine 1L. That is, when the output of the power generation system changes, the torque of the low-pressure turbine 1L changes. The speed of the second rotation shaft 4L does not change.

Meanwhile, the first rotation shaft 4H is not directly connected to the second rotation shaft 4L. The high-pressure turbine 1H and the low-pressure turbine 1L are only energetically connected to each other by passage of the same combustion gas, and the rotational speed of the first rotation shaft 4H is variable. This rotational speed is determined as follows. As the compressor 11 rotates, the blades in the machine take in the air and compress the air. In order to compress the air, there is a need for a driving force for rotating the compressor 11. Meanwhile, the expanded combustion gas from the combustor 10 hits the high-pressure turbine 1H to generate rotational force. When the jet energy of the combustion gas exceeds the power for driving the compressor 11, this engine starts autonomous rotation. When the output of the synchronous power generator 3 due to the rotation of the low-pressure turbine 1L becomes the rated output and the rotational force of the high-pressure turbine 1H and the power necessary for driving the compressor 11 are balanced, the rotational speed of the first rotation shaft 4H becomes the reference rotational speed determined by the design value.

The gas turbine 2B of this embodiment includes an inlet guide vane 12 (IGV) for controlling the speed of the first rotation shaft 4H at the inlet of the compressor 11. The IGV 12 variably controls the angle of the blades so that it is possible to adjust the flow rate of air taken into the compressor 11. When the IGV 12 is closed, the amount of air entering the compressor decreases, and as a result, the power for driving the compressor 11 decreases. Accordingly, the rotational speed of the first rotation shaft 4H can be enhanced. In contrast, when the IGV 12 is opened, since the amount of air taken into the compressor 11 increases, the power for driving the compressor 11 increases and the rotational speed of the first rotation shaft 4H decreases. In this way, the power generation system has a speed adjustment mechanism (a rotational speed adjustment unit) that adjusts the rotational speed of the first rotation shaft 4H as in the IGV 12.

The power generation system of the present embodiment includes a gas turbine control device 20A that controls the gas turbine 2B. The gas turbine control device 20A includes a fuel control device 201A, and an IGV control device 202A. The fuel control device 201A controls the amount of injected fuel of the combustor 10 to perform a combustor control that adjusts the output of the power generation system to match the command value. The IGV control device 202A controls the angle of the IGV 12 to perform a rotational speed control (speed adjustment mechanism control) for adjusting the rotational speed of the first rotation shaft 4H to match a preset reference value. The gas turbine control device 20A receives the combustion temperature of the combustor 10, the rotational speed of the first rotation shaft 4H measured by the speed sensor 8, and the output of the power generation system measured by a power generator wattmeter 42A, and uses them for a feedback control.

In the drawing, a broken line between the system control device 20 and the gas turbine control device 20A, a broken line between the fuel control device 201A and the combustor 10, a broken line between the IGV control device 202A and the IGV 12, a broken line between the system control device 20 and the converter control device 20B, and a broken line between the converter control device 20B and the frequency converter 6 represent signal lines for measurement and control. Further, a broken line from the current sensor 42A to the fuel control device 201A, a broken line from the speed sensor 8 to the fuel control device 201A, a broken line from the speed sensor 8 to the converter control device 20B, a broken line from the current sensor 41 to the converter control device 20B, and a broken line from the current sensor 42B to the converter control device 20B represent signal lines for measurement.

Hereinafter, the rotational speed control will be described with the power generation system of the two-shaft gas turbine which does not use the electric motor 9 as a first comparative example.

Figure 2:
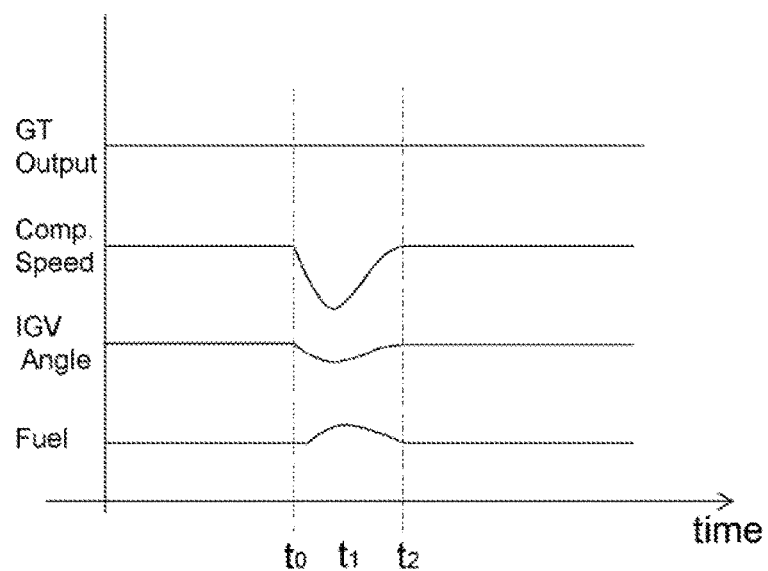
FIG. 2 illustrates a rotational speed control of a first comparative example.

FIG. 2 illustrates the rotational speed control of the first comparative example.

In the drawing, a horizontal axis represents the time, and a vertical axis represents an output (GT Output) of the power generation system of the first comparative example, a rotational speed (Comp. Speed) of the compressor, an IGV angle (IGV Angle), and a fuel injection amount (Fuel). When the rotational speed of the compressor has dropped for some reason from the time t0 to the time t1, the gas turbine control device for the power generation system of the first comparative example performs the rotational speed control, thereby closing the angle of IGV 12 in accordance with the rotational speed of the compressor. As a result, an aspect in which the rotational speed returns to the reference value at the time t2 is illustrated. At this time, assuming that the output of the power generation system of the first comparative example is constant, since energy for restoring the amount of reduction of the rotational speed of the compressor is obtained from the combustion energy, the injection fuel amount also increases.

The power generation system of this embodiment includes the electric motor 9 connected to the first rotation shaft 4H, and performs the torque control (frequency converter control) of the electric motor 9, in addition to such rotational speed control.

The electric motor 9 is an AC electric motor, and is driven at a variable speed by the frequency of the AC of the frequency converter 6. The converter control device 20B makes the frequency applied to the frequency converter 6 variable. The rotational speed of the electric motor 9 is fed back to the converter control device 20B by the speed sensor 8.

The frequency converter 6 includes an inverter 6A on the side of the electric motor 9, and an inverter 6B on the side of the system 100. The direct current side of the inverter 6A and the direct current side of the inverter 6B are connected to each other by direct current. The converter control device 20B can change the rotational speed of the electric motor 9 by changing the AC frequency of the inverter 6A. Meanwhile, the converter control device 20B synchronizes the AC of the inverter 6B with the AC of the system 100 at all times. When the converter control device 20B performs the torque control, the rotational speed of the electric motor 9 changes. As a result, similarly to the principle of the flywheel, the electric motor 9 can input and output the kinetic energy of rotation of the first rotation shaft 4H as electric energy. That is, since the product of the torque and the square of the rotational speed at that time is the input and output of the motor 9, while the converter control device 20B controls the torque, the kinetic energy of the first rotation shaft 4H increases or decreases. The rotational speed range of the first rotation shaft 4H corresponds to energy that can be stored. The rated rotational speed of the compressor 11 connected to the first rotation shaft 4H is, for example, from 5,000 to 40,000 rpm. Meanwhile, there are restrictions of the operating speed range on the compressor 11 due to problems such as surge, and in some cases, the operating speed range may be lowered only by about 10 to 20% from the rated speed. Further, in terms of strength design against centrifugal force, the upper limit of the rotational speed is about 120% of the rated speed. Therefore, the rotational speed range which is variable in this system is actually at most 80 to 120% of the rated speed.

Figure 3:
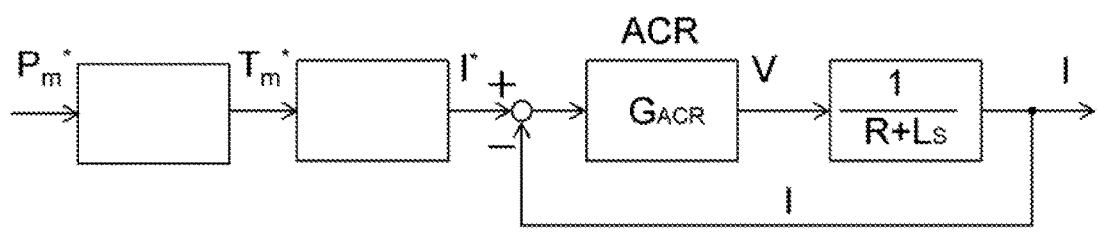
FIG. 3 illustrates a motor control system in a converter control device 20B.

FIG. 3 illustrates a motor control system in the converter control device 20B.

In the motor control system, the current I measured by the current sensor 41 is feedback-controlled by a current controller ACR (Automatic Current Regulator). Since the current can be linearly converted into the magnetic flux and the torque, the control of current becomes the torque control. The motor control system converts a command value Pm* of the electric power of the electric motor 9 into a command value Tm* of the torque, and converts a command value Tm* of the torque into a command value I* of current. The motor control system further calculates a deviation of the measured current I on the command value of the current, calculates a voltage V for reducing the deviation by the ACR, converts the calculated voltage V into the current I, and outputs the instruction of the current I to the frequency converter 6. The frequency converter 6 causes the instructed current to flow to the electric motor 9. A change in the rotational speed of the first rotation shaft 4H depends on the inertia of the first rotation shaft 4H. However, when giving the torque, the current is changed. Therefore, the response of the torque control is equal to the input and output responses of the electric power of the electric motor 9. Thus, the converter control device 20B can control the electric power at high speed.

The flywheel control will be described below as a second comparative example.

Figure 4:
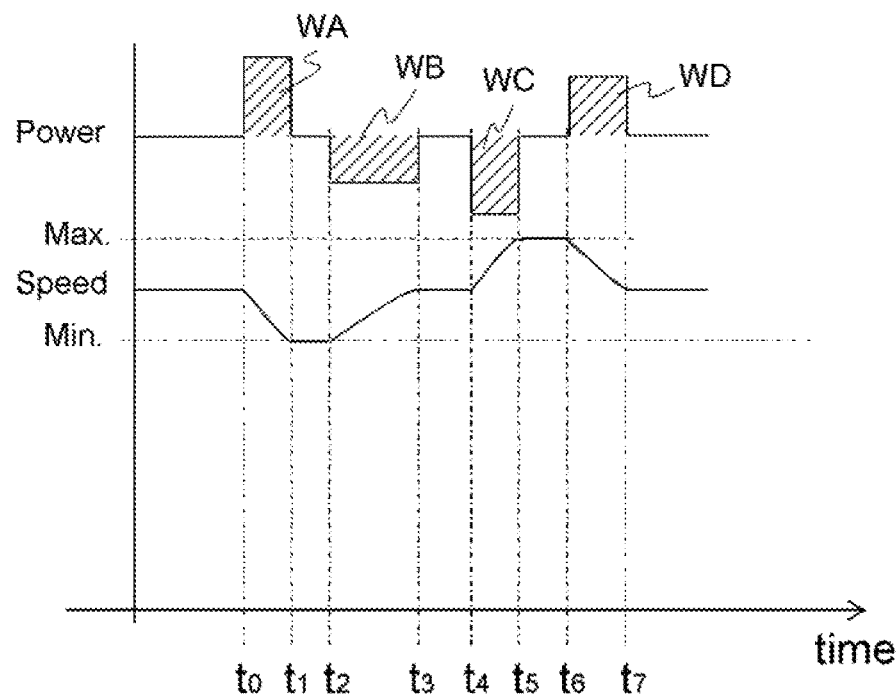
FIG. 4 illustrates a flywheel control of a second comparative example.

FIG. 4 illustrates the flywheel control of the second comparative example.

In the drawing, a horizontal axis represents the time, and a vertical axis represents the input and output power (Power) of the flywheel, and the rotational speed (Speed) of the flywheel. Furthermore, a vertical axis represents the upper limit (Max.) and the lower limit (Min.) of the rotational speed. When the flywheel outputs constant electric power from the time t0, the rotational speed of the flywheel decreases, and when the rotational speed reaches the lower limit at the time t1, there is a need to stop the output. For this reason, it is necessary to input the electric power to the flywheel from the time t2 to the time t3 and to return the rotational speed to the reference value. When the flywheel absorbs the electric energy from the next time t4, the rotational speed increases and reaches the upper limit at the time t5. Therefore, there is a need to release electric energy from the flywheel at the time t6 to reduce the rotational speed. That is, unless the input and output are controlled so that areas WA and WB are the same, the rotational speed does not return to the reference value. Similarly, it is necessary to provide control so that areas WC and WD are the same. As described above, since it is necessary to similarly keep the input energy and the output energy, the flywheel cannot continuously input or output energy, and the flywheel cannot intermittently repeat the input or intermittently repeat the output.

Hereinafter, the load demand for the power generation system of the present embodiment will be described.

Figure 5:
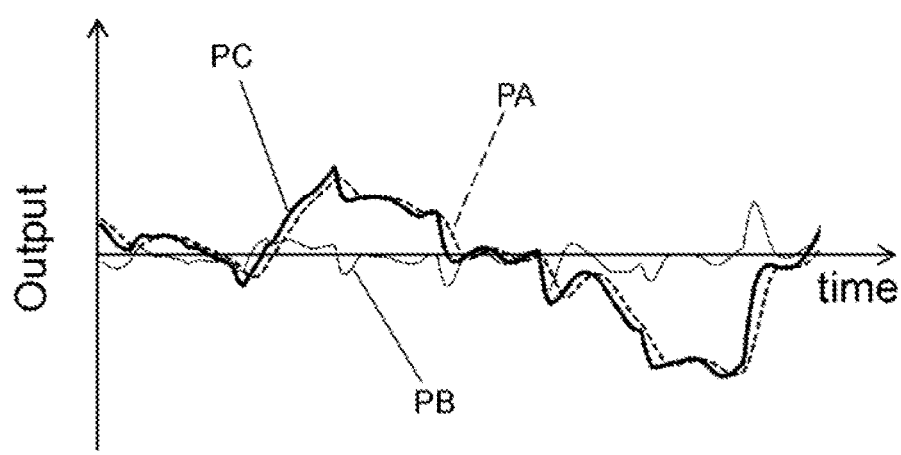
FIG. 5 illustrates a distribution of load demand.

FIG. 5 illustrates the distribution of the load demand.

The system control device 20 receives a load demand which is a request for output of the power generation system from the outside, such as a central power supply command station. In the drawing, the horizontal axis represents the time, and the vertical axis represents the electric power indicated by the load demand PC, the electric power indicated by the command PA from the system control device 20 to the gas turbine control device 20A, and the electric power indicated by the command PB from the system control device 20 to the converter control device 20B. In the example of the drawing, in regard to the load demand PC to the power generation system, it is assumed that the output control for the synchronous power generator 3 performed by the gas turbine control device 20A cannot follow the time change of the load demand PC. Therefore, the system control device 20 smoothes the load demand PC, thereby calculating the command PA with a gentle change in time, and giving the command PA to the gas turbine control device 20A. For example, the system control device 20 smoothes the load demand PC by performing a movement average of a predetermined time length on the load demand PC. Further, the system control device 20 calculates a difference between the command PA and the actual load demand PC as a command PB, and gives the difference to the converter control device 20B.

The gas turbine control device 20A controls the injection fuel amount of the combustor 10 in accordance with the command PA, thereby adjusting the output of the synchronous power generator 3 to match the command PA. The converter control device 20B controls the input and output of the motor 9 provided by the frequency converter 6 in accordance with the command PB, thereby adjusting the input and output of the motor 9 to match the command PB. Thus, the power generation system can adjust the output to the system 100 to match the load demand. Since the command PB is a component that rapidly changes, the system control device 20 causes the output of the electric motor 9 capable of controlling the electric power at high speed to follow the command PB. In this manner, the system control device 20 can distribute the load demand PC to the low-speed synchronous power generator 3 and the high-speed electric motor 9. In calculation of the command PA, the system control device 20 may smooth the load demand PC using a low-pass filter or a band-pass filter instead of the movement average.

When the electric power is input and output using the electric motor 9, the rotational speed of the compressor 11 changes. Accordingly, if a certain time elapses, the output of the power generation system changes. However, since the amount of working gas inside the gas turbine is huge and becomes a buffer, the output does not rapidly change. For example, the change speed of the output of a general gas turbine power generation system is about 10% of the rated output for one minute. Therefore, the output of the gas turbine power generation system can be regarded as constant for a high-speed load change, and the command PA of the output of the synchronous power generator 3 and the command PB of the input and output of the electric motor 9 are independently controllable.

Figure 6:
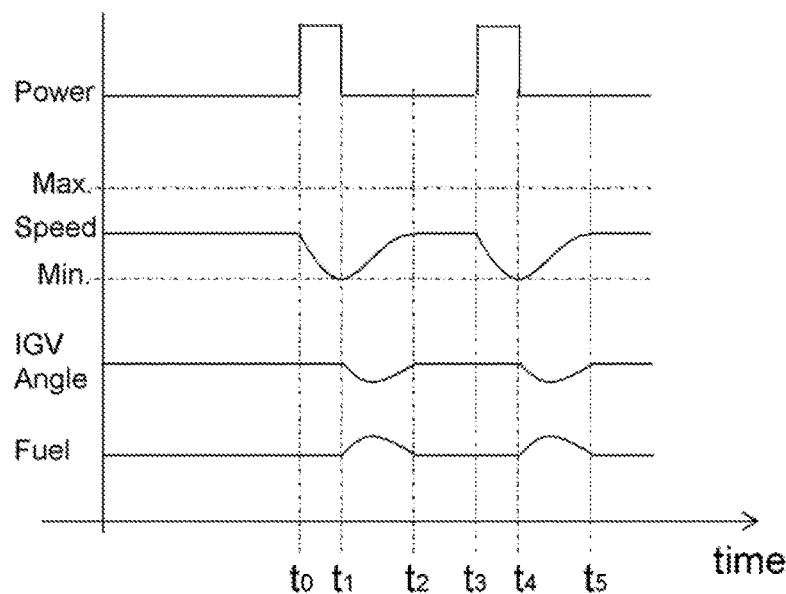
FIG. 6 illustrates a first control method for a gas turbine combined power generation system.

FIG. 6 illustrates a first control method for the gas turbine combined power generation system.

In the drawing, the horizontal axis represents the time, and the vertical axis represents the input and output power (Power) of the electric motor 9, the rotational speed (Speed) of the compressor 11, the IGV angle (IGV Angle), and the amount of injected fuel (Fuel). It is assumed that the output of the synchronous power generator 3 does not change during the illustrated period. The converter control device 20B acquires the output from the electric motor 9 to the system 100 measured by the electric motor wattmeter 42B. Regarding the reference sign of the electric power of the input and output of the electric motor 9 in the drawing, the positive electric power indicates a case where the electric motor 9 outputs the electric power to the system 100 as the electric motor 9 becomes the load of the gas turbine 2B, and the negative electric power is a case where a part of the output of the synchronous power generator 3 is supplied to the electric motor 9 to assist the driving force of the compressor 11. Between the time t0 and the time t1, when the converter control device 20B causes the electric motor 9 to output a constant value in a pulsed manner by the torque control, the rotational speed decreases accordingly, and after the rotational speed reaches the lower limit, the converter control device 20B stops the output of the electric motor 9. Between the times t0 and the time t1, the gas turbine control device 20A stops the rotational speed control. When the gas turbine control device 20A enables the rotational speed control from the time t1, the IGV 12 is closed and the rotational speed is increased. When the rotational speed returns to the reference value, the gas turbine control device 20A returns the IGV 12 to the original angle. In this way, when the converter control device 20B performs the torque control to cause the electric motor 9 to output the electric power, the gas turbine control device 20A stops the rotational speed control. Also, when the rotational speed reaches the upper limit or the lower limit, the converter control device 20B stops the torque control and the gas turbine control device 20A restores the rotational speed by the rotational speed control. With such control, the frequency converter 6 can intermittently repeat the pulse output from the electric motor 9 as positive electric power. Similarly, the frequency converter 6 can intermittently repeat the pulse input to the electric motor 9 as negative electric power. Further, the system control device 20 can perform a simple and stable control by stopping the rotational speed control during the torque control period.

Figure 7:
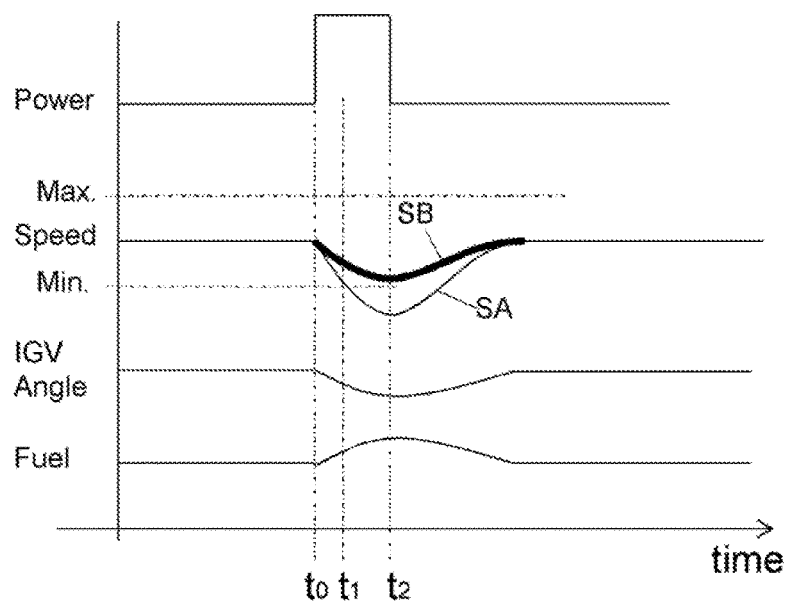
FIG. 7 illustrates a second control method for a gas turbine combined power generation system.

FIG. 7 illustrates a second control method for the gas turbine combined power generation system.

In the drawing, a horizontal axis and a vertical axis are the same as those of FIG. 6. The second control method enables the torque control and the rotational speed control of the gas turbine from the time t0. It is also assumed that the output of the synchronous power generator 3 does not change during the illustrated period. In the first control method, when the converter control device 20B causes the electric motor 9 to output the electric power by the torque control from the time t0, in some cases, the rotational speed rapidly drops as indicated by the curve SA to reach the lower limit at the time t1, and the electric motor 9 may not output the electric power. Meanwhile, in the second control method, since the speed reduction can be suppressed by performing the rotational speed control regardless of the period of the torque control even after the time to, the change in the rotational speed becomes gentle as indicated by the curve SB. As a result, it is possible to output the electric power from the electric motor 9 for a longer time than the first control method.

Further, in the present embodiment, the IGV 12 is used as an example of the speed adjustment mechanism. However, it goes without saying that a regulating valve of the flow rate of another unit capable of adjusting the driving force balance of the high-pressure turbine 1H and the low-pressure turbines 1L, for example, a bypass pipe provided between the high-pressure turbine 1H and the low-pressure turbines 1L, is also applicable as the speed adjustment mechanism.

According to the present embodiment, the electric motor 9 can convert the electric energy, which is input from the frequency converter 6, into the kinetic energy of the high-pressure turbine 1H and the compressor 11, and can convert the kinetic energy of the high-pressure turbine 1H and the compressor 11 into electric energy which is output to the frequency converter 6. Thus, the converter control device 20B can supply or absorb electric power to the electric motor 9 by performing the torque control for changing the rotational speed of the electric motor 9 on the frequency converter 6. Further, the gas turbine control device 20A can restore the rotational speed changed by the torque control to the reference value by performing the rotational speed control for adjusting the rotational speed to match the reference value on the IGV 12. As a result, the electric motor 9 can repeat one of the input and the output of the electric power.

Second Embodiment

In the present embodiment, a gas turbine combined power generation system using a single-shaft gas turbine will be described.

Figure 8:
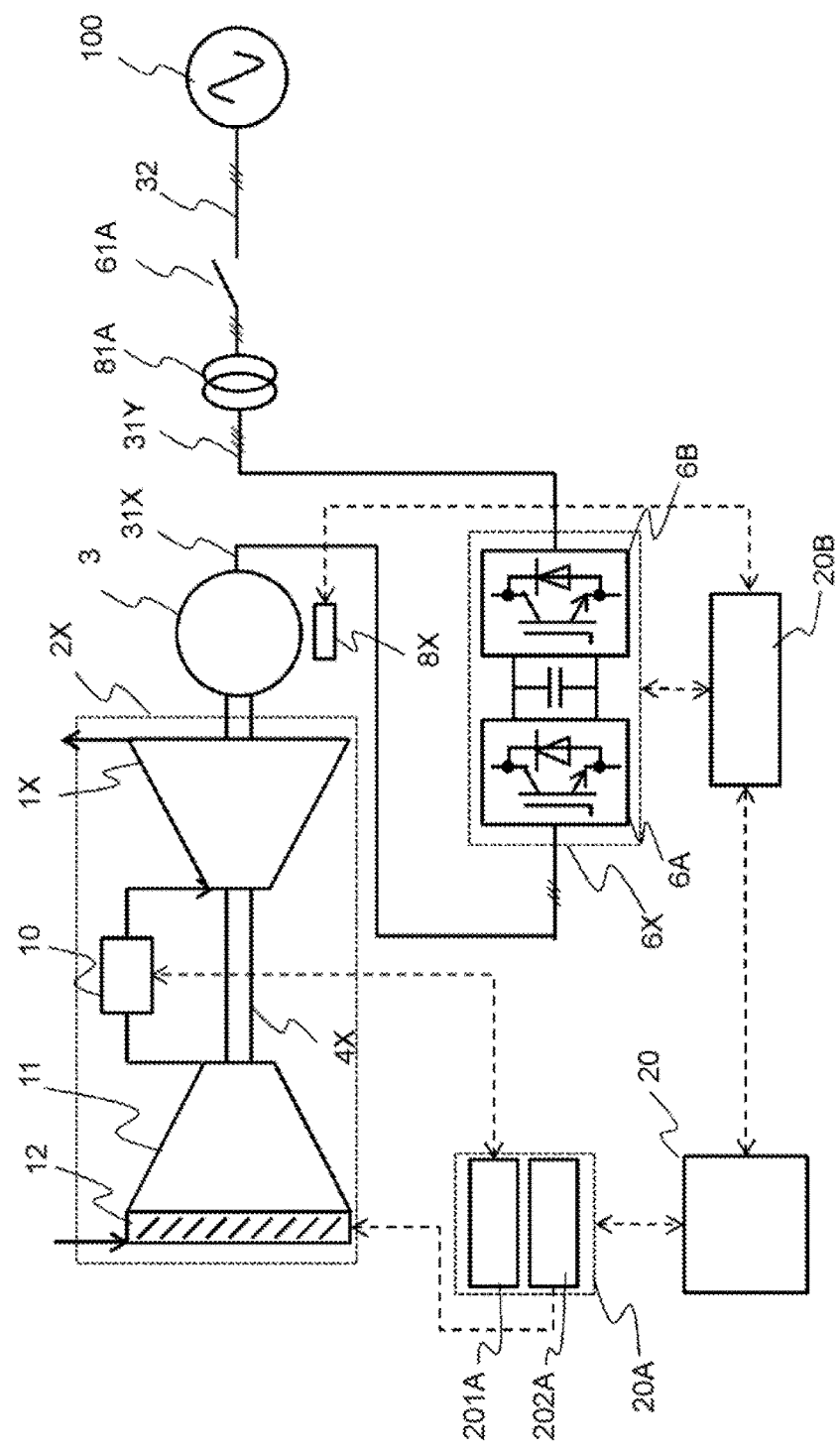
FIG. 8 illustrates a configuration of a gas turbine combined power generation system according to a second embodiment of the present invention.

FIG. 8 illustrates a configuration of a gas turbine combined power generation system according to a second embodiment of the present invention.

In the drawing, the elements denoted by the same reference numerals as those illustrated in the first embodiment represent elements identical or equivalent to the elements illustrated in the first embodiment. Compared with the power generation system of the first embodiment, the power generation system of the second embodiment includes a gas turbine 2X instead of the gas turbine 2B, includes a frequency converter 6X instead of the frequency converter 6, includes power transmission paths 31X and 31Y instead of the power transmission path 31, and includes a speed sensor 8X instead of the speed sensor 8.

As compared with the gas turbine 2B, the gas turbine 2X includes a turbine 1X instead of the high-pressure turbine 1H and the low-pressure turbine 1L, and includes a rotation shaft 4X instead of the first rotation shaft 4H and the second rotation shaft 4L. The turbine 1X is mechanically connected to the rotation shaft 4X without using a gear. The rotation shaft 4X is mechanically connected to the synchronous power generator 3 without using a gear. The rotation shaft 4X is further mechanically connected to the compressor 11 without using a gear. The turbine 1X is driven by the combustion gas obtained by the combustor 10.

The output of the synchronous power generator 3 is input to the frequency converter 6X via the power transmission path 31X. The output of the frequency converter 6X based on this input is input to the transformer 81A via the power transmission path 31Y. The speed sensor 8X measures the rotational speed of the synchronous power generator 3 and outputs the rotational speed to the converter control device 20B.

When the single-shaft gas turbine 2X is operated at a variable speed, since the frequency of the synchronous power generator 3 changes, in order to interconnect the synchronous power generator 3 to the system 100, it is necessary to convert the frequency. In this case, the frequency converter 6X needs to have the same capacity as the synchronous power generator 3. In the present embodiment, the converter control device 20B performs the torque control for controlling the frequency converter 6X, thereby enabling the input and output of energy corresponding to the change in rotational speed. In this embodiment, as in the first control method, it is also possible to perform the rotational speed control and the torque control at the different timings from each other, and the same effect as in the first embodiment can be obtained. Also, in the present embodiment, similarly to the second control method, it is possible to reduce the variation width of the rotational speed itself by simultaneously performing the rotational speed control and the torque control.

According to this embodiment, the synchronous power generator 3 can convert the electric energy, which is input from the frequency converter 6X, into the kinetic energy of the turbine 1X and the compressor 11, and can convert the kinetic energy of the turbine 1X and the compressor 11 into the electric energy which is output to the frequency converter 6X.

Meanwhile, in the first embodiment, it is possible to reduce the frequency converter 6. In the first embodiment, since most of the output of the power generation system is output from the synchronous power generator 3, the capacity of the frequency converter 6 in the power transmission path 35 other than the synchronous power generator 3 is arbitrarily determined. Generally, the ratio of the capacity requiring the high-speed power control to the total power generation capacity of the power generation system is small. If the capacity to adjust electric power at high speed is set to 1/10 of the total capacity, the capacity of the frequency converter 6 can be reduced to 1/10 of the total power generation capacity. As a result, the cost of the power converter can be lowered. Since the electric device having different capacities usually has different voltages, the transformer 81B and the circuit breaker 61B are provided between the synchronous power generator 3 and the frequency converter 6 of the first embodiment, and the transformer 81B converts the voltages of the synchronous power generator 3 and the frequency converter 6.

In the second embodiment, if the frequency converter 6X breaks down, the system stops. However, in the first embodiment, even if the frequency converter 6 breaks down, if the circuit breaker 61B is opened to stop the electric power from the power transmission path 35, the power generation system can perform the power generation control by the gas turbine control device 20A. As described above, according to the first embodiment, it is possible to continue the operation against the breakdown of the frequency converter 6.

The power generation system of each of the embodiments described above includes an electric motor provided on the rotation shaft of the gas turbine, and drives the electric motor by the frequency converter. The rotating body is a compressor and a turbine of the gas turbine, and it is possible to charge and discharge the electric power with a high-speed response like a flywheel by operating the rotating body with the electric motor at a variable speed. Since the gas turbine is a prime mover, it has a speed adjustment mechanism. If the rotational speed changed by the operation of the electric motor is returned to the reference value by the speed adjustment mechanism of the gas turbine, the electric motor can perform charging and discharging again in the positive direction or the negative direction, and can intermittently repeat one of the input and output of the electric motor.

Terms for expression of the present invention will be described. The first rotation shaft may include one of the first rotation shaft 4H and the rotation shaft 4X. The first turbine may include one of the high-pressure turbine 1H and the turbine 1X. The rotating electric machine may include one of the electric motor 9 and the synchronous power generator 3. The speed adjustment mechanism may include the IGV 12. The controller may include a system control device 20, a gas turbine control device 20A, and a converter control device 20B. The control device may include the system control device 20, the gas turbine control device 20A, and the converter control device 20B. The acquisition unit may include the system control device 20. The combustor control unit may include a fuel control device 201A. The speed adjustment mechanism control unit may include an IGV control device 202A. The frequency converter control unit may include a converter control device 20B. The gas turbine control device may include a gas turbine control device 20A. The control device may include the system control device 20 and the converter control device 20B.

REFERENCE SIGNS LIST

1H . . . high-pressure turbine, 1L . . . low-pressure turbine, 1X . . . turbine, 2B . . . gas turbine, 2X . . . gas turbine, 3 . . . synchronous power generator, 4H . . . first rotation shaft, 4L . . . second rotation shaft, 4X . . . rotation shaft, 6 . . . frequency converter, 6A . . . inverter, 6B . . . inverter, 6X . . . frequency converter, 8 . . . speed sensor, 8X . . . speed sensor, 9 . . . electric motor, 10 . . . combustor, 11 . . . compressor, 12 . . . inlet guide vane, 20 . . . system controller, 20A . . . gas turbine control device, 20B . . . converter control device, 41 . . . current sensor, 42A . . . power generator wattmeter, 42B . . . electric motor wattmeter, 61A . . . circuit breaker, 61B . . . circuit breaker, 81A . . . transformer, 81B . . . transformer, 100 . . . system, 201A . . . fuel control device, 202A . . . IGV control device

The invention claimed is:

1. A gas turbine power generation system, comprising:
a first rotation shaft;
a compressor which generates compressed air by pressurizing air in accordance with rotation of the first rotation shaft;
a combustor which generates combustion gas by mixing and combusting the compressed air and fuel;
a first turbine which rotates by receiving the combustion gas to drive the first rotation shaft;
a rotating electric machine connected to the first rotation shaft;
a speed adjustment mechanism which controls the speed of the compressor by adjusting the amount of the air;
a frequency converter which is connected between the rotating electric machine and an electric power system via an electric power line to convert the frequency of the electric power;
a controller which acquires a request for output of the gas turbine power generation system and controls the combustor on the basis of the request;
a second rotation shaft;
a second turbine which rotates by receiving the combustion gas flowing out of the first turbine to drive the second rotation shaft; and
a power generator connected to the electric power system and the frequency converter via an electric power line to generate electric power in accordance with rotation of the second rotation shaft, wherein the controller performs a frequency converter control for changing a rotational speed of the rotating electric machine on the basis of the request, on the frequency converter,
the rotating electric machine performs supply or absorption of electric power in accordance with the change in the rotational speed,
the controller performs a speed adjustment mechanism control for adjusting the rotational speed to match a reference value, on the speed adjustment mechanism,
the request comprises a command value representing a time change of an output of the gas turbine power generation system, and
the controller calculates a first command value by smoothing the command value, calculates a second command value by subtracting the first command value from the command value, performs a combustor control for adjusting an output of the power generator to match the first command value on the combustor, and performs the frequency converter control for changing the rotational speed in accordance with the second command value on the frequency converter.

2. The gas turbine power generation system according to claim 1, further comprising:
a transformer connected between the frequency converter and the electric power generator via an electric power line,
wherein the transformer steps up the output of the frequency converter to output the stepped-up output to the electric power system, and steps down the output of the electric power generator to output the stepped-down output to the frequency converter.

3. The gas turbine power generation system according to claim 2, wherein the speed adjustment mechanism comprises a blade provided at an inlet of air in the compressor, and changes an angle of the blade on the basis of a command from the controller.

4. The gas turbine power generation system according to claim 1, wherein the controller stops the speed adjustment mechanism control during period of the frequency converter control.

5. The gas turbine power generation system according to claim 1, wherein the controller performs the speed adjustment mechanism control during period of the frequency converter control.

6. The gas turbine power generation system according to claim 1, wherein the rotating electric machine generates electric power in accordance with rotation of the first rotation shaft.

7. A method for controlling the gas turbine power generation system, the method comprising:
acquiring a request for an output of the gas turbine power generation system according to claim 1;
controlling the combustor on the basis of the request;
performing the frequency converter control for changing the rotational speed of the rotating electric machine on the basis of the request, on the frequency converter;
performing supply or absorption of electric power in accordance with the change in the rotational speed by the rotating electric machine; and
performing the speed adjustment mechanism control for adjusting the rotational speed to match the reference value, on the speed adjustment mechanism.

* * * * *